United States Patent [19]

Dennesen et al.

[11] 4,344,807

[45] Aug. 17, 1982

[54] SPIRAL WINDING OF FILAMENTS

[76] Inventors: Joseph C. Dennesen, 62 Bridge St., Beverly, Mass. 01915; Francis G. Dennesen, 16 Long Bow Cir., Lynnfield, Mass. 01940

[21] Appl. No.: 953,912

[22] Filed: Oct. 23, 1978

[51] Int. Cl.$^3$ ........................ B32B 31/00; H04R 19/00

[52] U.S. Cl. .................................... 156/155; 156/173; 156/175; 156/241; 179/111 R

[58] Field of Search ............... 156/169, 168, 172, 173, 156/175, 180, 155, 143, 144, 425, 431, 432, 434, 433, 230, 241; 179/111 R; 29/469.5, 605; 242/47.11, 7.13, 9, 7.02, 7.03, 7.11

[56] References Cited

U.S. PATENT DOCUMENTS

| | | | |
|---|---|---|---|
| 2,177,260 | 10/1939 | Laube | 156/173 |
| 2,282,759 | 5/1942 | Gavitt | 156/173 |
| 3,274,316 | 9/1966 | Songer | 156/144 |
| 3,414,449 | 12/1968 | Beach | 156/173 |
| 3,796,620 | 3/1974 | Dunn | 156/432 |
| 3,800,102 | 3/1974 | Janszen | 179/111 R |
| 3,966,523 | 6/1976 | Jakobsen | 156/173 X |
| 4,135,294 | 1/1979 | Brown | 242/7.03 X |

FOREIGN PATENT DOCUMENTS

| | | | |
|---|---|---|---|
| 764697 | 1/1957 | United Kingdom | 242/9 |

*Primary Examiner*—Lorraine T. Kendell
*Attorney, Agent, or Firm*—Thomas C. Stover, Jr.

[57] ABSTRACT

Method and apparatus are provided for the spiral winding of a filament wherein e.g. a wire is directed by a guide plate into the spiral groove of a template and the template is rotated to wind the wire into a spiral winding. The winding is then bonded to a backer member to form a spirally wound element e.g. an electrostatic driver component in a speaker unit and the element is then separated from the template.

13 Claims, 6 Drawing Figures

SPIRAL WINDING OF FILAMENTS

FIELD OF THE INVENTION

This invention relates to method and apparatus for spiral winding of a filament of material particularly spiral winding of such filament wherein the windings are spaced from one another.

THE PRIOR ART

Several methods have been developed for winding filaments to obtain a spiral, including a flat spiral element for such application as electrostatic speaker units wherein spiral windings of wire are disposed on each side of a flexible diaphragm. The several methods of winding such spiral elements are described and disclosed in U.S. Pat. No. 3,800,102 to Janszen and other patents cited therein. The methods described therein detail carefully spaced spiral winding of wires with periodic soldering thereof to a support frame. In a more recent method, the spiral wire of electrode is wound with a spacer strand such that wire and spacer strand are spirally wound together, the spacer strand providing separation for each winding of the wire. After the wire is wound, the spacer strand must be removed from between the windings of the wire which can cause dislocation of the wire winding and attendant difficulty in removing all portions of the so-wound strand. To avoid this difficulty, it has been the practice to wind the wire and the spacer strand in a staggered relationship i.e. the spacer strand is wound slightly above the plane of the wire winding to prevent jamming of such spacer strand between the turns or the windings thereof. However, this method of co-winding wire and spacer is more difficult than the first method, above and there is still difficulty in separating the wire and spacer coils. There is therefore a need and market for spiral winding method and apparatus which avoids the cumbersome multi steps of the prior art and winds a filament in a spiral pattern quickly and dependably with controlled spacing between the respective windings.

There has now been discovered a method and apparatus for spiral winding filaments of material, e.g. wire into a spaced spiral pattern. The invention provides for rapid winding of wire into a coil that has regular spacing between the windings, that is rapid, reproduceable and uniform and lends itself to mass production. The method and apparatus of the present invention further obviate the need for engaging and then disengaging a spacer strand of material.

SUMMARY

Broadly, the present invention provides a method for spiral winding of a filament comprising, contacting a leading portion of said filament with a portion of a spiral wound groove impressed in a surface of a winding member, pressing said filament against said groove and rotating said member to cause the filament to be guided into said groove to wind it into a spiral winding.

The invention further provides an apparatus for spiral winding a filament comprising, a member having a winding surface, a spiral groove cut into said winding surface, means to secure the end of a filament placed in contact with a portion of said spiral groove, guide means to urge said filament into said groove means to feed said filament to said groove and means to rotate said member to wind said filament into a spiral winding.

BRIEF DESCRIPTION OF THE DRAWINGS

The invention will become more apparent from the following detailed specification and drawings in which.

DETAILED DESCRIPTION OF THE DRAWINGS

Figure 1:
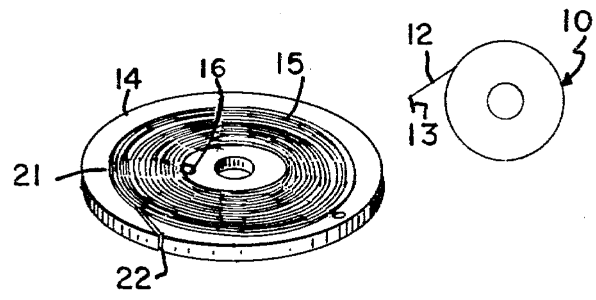
FIG. 1 is an isometric projection partially schematic view of components of the spiral winder embodying the present invention.

Referring now to the drawings, melted wax is coated onto the grooved surface of the grooved template 14 shown in FIG. 1. The wax cools and solidifys in the grooved template 14 to form a wax binder coating 21 as indicated in FIG. 1. Then the wire 12 is fed from the supply roll 10 to the grooved template 14, shown in FIG. 1. The end 13 of the wire 12 is bent and inserted into aperture 16 of the template 14, as shown in FIG. 1.

Figure 2:
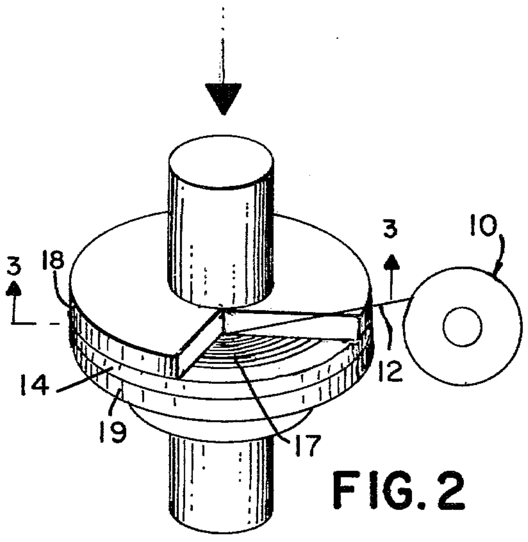
FIG. 2 is an isometric projection partially schematic view of a more complete assembly of the spiral winder embodying the present invention.
Figure 3:
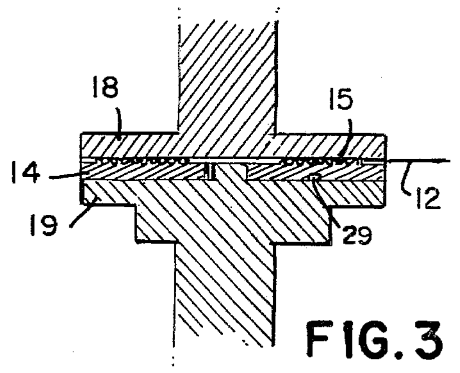
FIG. 3 is a sectional elevation view of a portion of the spiral winder assembly, shown in FIG. 1, taken on line 3—3, looking in the direction of the arrows.

Thereupon rotatable drive member 19 is raised beneath and into contact with grooved template 14 and guide member 18 is lowered into place over the template 14 into contact with the wire 12, as shown in FIGS. 2 and 3. The rotatable drive member 19 has an upward projection 29, shown in FIG. 3, which extends between and engages spokes (not shown) located on the underside of the template 14. Accordingly, the guide member 18 is stationary while the drive member 19 and the template 14 rotate together.

Figure 4:
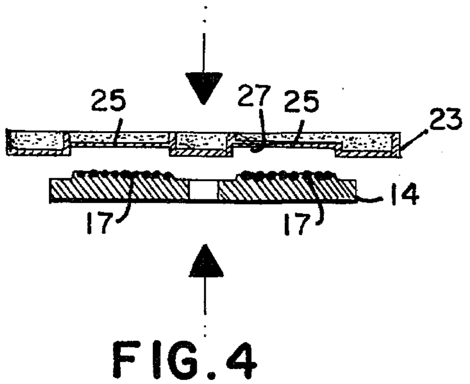
FIG. 4 is a sectional elevation view of an assembly step of the spiral winder product embodying the present invention.

The drive member 19 is then rotated (by means not shown) which rotates the adjacent template 14 and causes the wire 12 to be guided by the guide member 18 into the spiral groove 15 of the template 14, to coil the wire 12 into a spiral winding 17, as shown in FIGS. 1, 2 and 3. The wedge shaped section 20, cut out of the guide member 18, as shown in FIG. 2, permits the winding of the wire 12 to be observed in progress and directs the wire 12 into the groove 15. The wax 21 in the groove 15 of the template 14, conforms to the shape of the groove e.g. forms a cross-sectionally curved surface therein which receives the wire in close contact and grips and holds same in place, as indicated in FIG. 4.

Figure 5:
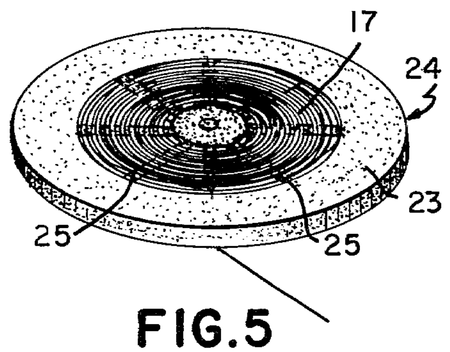
FIG. 5 is an isometric projection of a spiral wound product manufactured according to the present invention and FIG. 6 is a partial elevation schematic view of the spiral wound product of FIG. 5 being connected in electric circuitry.

Upon completion of the winding step, the guide member 18 is removed and the outer portion of the wire 12 is temporarily tucked into slot 22 of the grooved template 14, shown in FIG. 1, and the wire is cut off. The wire winding 17, on the template 14, is then contacted with the adhesive coated radial ribs 25 of a plastic backer disc 23, as shown in FIG. 4. The adhesive, e.g. epoxy resin 27 bonds the wire winding 17 to the disc 23. Heat is then applied to the template 14 to melt the wax binder 21, releasing the winding 17 therefrom and the wire winding 17, bonded to the disc 23, is lifted off the template 14 to obtain the spiral wound disc member 24, shown in FIG. 5. The amount of heat so-applied is that sufficient to melt the wax binder so-employed.

Figure 6:
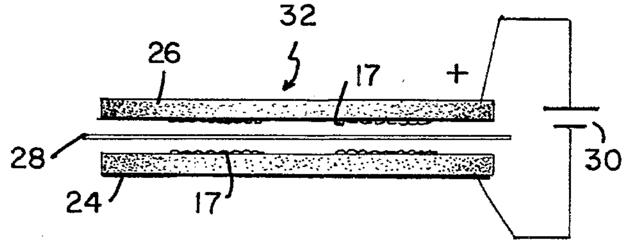

The above method is repeated to obtain another such spiral wound disc member 26 and the two wound members 24 and 26 are placed in spaced relationship so that the wire coils are face to face and a flexible membrane (about 3 mils thick) 28 is placed therebetween, as shown in FIG. 6. The coils are connected across an oscillating power source 30, which causes the membrane to vibrate according to an applied signal. The unit so-formed is employed as a driver element 32 in an electrostatic speaker system.

Also within the present invention, the spiral wound member can be prepared by an alternative method. The addition of wax to the template (e.g. member 14 of FIG. 1) is omitted and the wire winding wound and adhered in the grooves thereof by application of an electrostatic charge to such template. The remaining steps are conducted, as described above, including contacting the winding with an adhesive coated backer member to bond the two. The heating step is omitted, the electrostatic charge is disipated or drawn off and the winding, bonded to the backer member, is separated from the template as before.

Thus, the method and apparatus of the present invention provide a ready, rapid and uniform method for spiral winding of the wires or other filaments which can be set with an adhesive coated member or other material and removed from the grooved template as a finished component or product.

By "filament" as used herein, is meant any relatively slender strand of material such as wire, fiber and ribbon (including tape), of metal, plastic, glass and the like or a combination thereof and includes strands of various cross-sectional shape, including rounded, angular or a combination thereof.

The filament employed or wound in the present invention can be coated or uncoated, including an insulation coating, such as coated wire, where desired or bare wire, as shown in the drawings, within the scope of the invention.

The pressure applied by the guide member to guide a filament into the groove of a winding member can be up to 10 to 100 psig or more and preferably is between 25 to 75 psig.

The guide and support members can have disc shapes, as illustrated in the drawings and can be other shapes including angular, rounded or a combination thereof. These members, denoted grooved template or member, guide member and rotatable drive member, are preferably flat-surfaced to provide a flat spiral winding. However, such members or template can have a curved or angular shape or combination thereof where suitable within the scope of the present invention.

The guide member can be a continuously plate, including a disc, can be a apertured disc or a frame, provided it has sufficient surfaces to guide the wire into the spiral groove while such wire is being wound.

The grooved template, the guide member and the drive member can be of various materials, e.g. wood, plastic or metal and are preferably of metal, e.g. steel for durability.

The groove cut into the template is, as stated, a spiral groove. Such groove can be rectilinear or curvilinear, wound as called for by the application of the coil or a combination thereof. Accordingly, rectilinear spiral coils can be wound including rectangular, as well as other angularly wound coils and curvilinear spiral coils, including circular-like, oval-like, or other round wound coils or a combination of such coils according to the method of the present invention. Preferably a curvilinear spiral groove is employed in the winding method and apparatus of the present invention.

The groove, in cross-section can be angular but is preferably rounded and is shallow to permit the wound filament to extend above the plane of the grooved member, for ease of bonding and removal as described herein.

The spiral groove is cut in the template, preferably in a relatively flat plane. However, it may be cut in a curve or other three dimensional plane where desired.

While the drawings illustrate one spiral winding being wound, several spiral windings may be fabricated at one time by employing a plurality of grooved templates stacked one atop the other, with a filament being fed to each such template; the templates being rotated on a common axis to produce a plurality of spiral windings.

Various resins, waxes, cements or other bonding agents can be contacted with the wound filament to produce a finished spiral winding which is removed from the template once the bonding agent cures, hardens or otherwise, sets up. Examples of such bonding agents are polyesters plus catalyst e.g. epoxy.

In the spiral winding method of the present invention, the filament is preferably wound from the inside-out as illustrated in FIGS. 2 and 3 of the drawings. However, if desired, the winding can be conducted from the outside-in, e.g. by feeding the filament up through the center of the template and out to the outermost turn of the spiral groove and then applying guide pressure means and rotational means to wind the coil as previously described. The winding inside-to-out method is believed more convenient and is preferred.

What is claimed is:

1. A method for spiral winding a filament comprising, contacting a leading portion of said filament with a portion of a spiral-wound groove impressed in a surface of a winding member, pressing or directing said filament into said groove by means of a guide member while said winding member is rotated, to wind said filament into a spiral winding on said winding member, releasably holding said spiral winding in said groove, contacting said spiral winding with bonding material on a backer member to form a spirally wound element and removing said element from the winding member.

2. The method of claim 1 wherein said filament is contacted with a binding means on said winding member to releaseably hold said winding in place.

3. The method of claim 1 wherein the leading portion of said filament is contacted with an interior portion of said spiral groove and wound outwardly.

4. The method of claim 2 wherein said binding means is a wax coating in said groove which closely contacts around the portion of said filament closer to said groove to hold said winding in place.

5. The method of claim 2 wherein said binding means in an electrostatic charge applied to said winding member.

6. The method of claim 2 wherein a backer member having adhesive thereon is contacted with the exposed face of said winding to bond the backer member to said winding and separation means is applied to said binding means to release the winding and said backer member as a spirally wound element from said winding member.

7. The method of claim 6 wherein said separation means is the application of heat sufficient to melt a wax binder applied to said filaments and winding members.

8. The method of claim 6 wherein said separation means is the discharging of an electrostatic charge applied to said filament and winding member.

9. The method of claim 1 wherein a guide plate presses said filament against said groove during the winding thereof.

10. The method of claim 1 wherein the applied winding pressure is between 10 to 75 psig.

11. The method of claim 1 wherein the said filament is coated wire coiled in a substantially flat winding.

12. The method of claim 1, wherein said filament is a wire fed from a roll, bending the end of said wire and inserting same in an aperture in the interior portion of said spiral groove, winding said wire as aforesaid and snipping said wire near the outer end of said groove.

13. The method of claim 1, wherein two such spiral wound elements are formed and positioned so that the respective wire windings are in spaced opposed relationship and securing a flexible membrane therebetween to form a driver element in a speaker unit.

* * * * *